(12) United States Patent
Kawai

(10) Patent No.: US 6,942,934 B2
(45) Date of Patent: *Sep. 13, 2005

(54) GLASS MATERIAL FOR A SUBSTRATE, GLASS SUBSTRATE, AND INFORMATION RECORDING MEDIUM EMPLOYING THE SAME

(75) Inventor: Hideki Kawai, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/852,286

(22) Filed: May 25, 2004

(65) Prior Publication Data

US 2004/0214047 A1 Oct. 28, 2004

Related U.S. Application Data

(63) Continuation of application No. 10/227,287, filed on Aug. 26, 2002.

(30) Foreign Application Priority Data

Jun. 7, 2002 (JP) ........................ 2002-166548

(51) Int. Cl.⁷ .............................. G11B 5/82; C03C 3/093
(52) U.S. Cl. ......................... 428/694 SG; 428/694 ST; 501/64; 501/67
(58) Field of Search ................. 428/694 ST, 694 SG; 501/64, 66, 67

(56) References Cited

U.S. PATENT DOCUMENTS

| | | | |
|---|---|---|---|
| 5,997,977 A | * 12/1999 | Zou et al. | 428/64.1 |
| 6,187,407 B1 | 2/2001 | Zou et al. | |
| 6,187,441 B1 | * 2/2001 | Takeuchi et al. | 428/410 |
| 6,214,429 B1 | 4/2001 | Zou et al. | |
| 6,277,465 B1 | 8/2001 | Watanabe et al. | |
| 6,277,484 B1 | 8/2001 | Shimoda et al. | |
| 6,303,528 B1 | * 10/2001 | Speit et al. | 501/69 |
| 6,332,338 B1 | 12/2001 | Hashimoto et al. | |
| 6,340,647 B1 | * 1/2002 | Koyama et al. | 501/69 |
| 6,376,403 B1 | * 4/2002 | Koyama et al. | 501/69 |
| 6,387,510 B1 | 5/2002 | Nakashima et al. | |
| 6,537,648 B1 | * 3/2003 | Takahashi et al. | 428/141 |
| 6,599,606 B1 | * 7/2003 | Zou | 428/64.2 |
| 6,821,653 B2 | * 11/2004 | Fukushima et al. | 428/694 SG |
| 2001/0022705 A1 | 9/2001 | Mori et al. | |
| 2003/0232169 A1 | 12/2003 | Kawai | |

FOREIGN PATENT DOCUMENTS

JP          2002-25040          1/2002

* cited by examiner

*Primary Examiner*—Karl Group
(74) *Attorney, Agent, or Firm*—Burns, Doane, Swecker & Mathis LLP

(57) ABSTRACT

A glass material for a substrate, or a glass substrate, consists essentially of the following glass ingredients: from 45 to 70 wt % of $SiO_2$, from 1 to 10 wt % of $Al_2O_3$, from 0.5 to 8 wt % of $B_2O_3$, from 7 to 20 wt % of $Li_2O+Na_2O+K_2O$, from 0.1 to 10 wt % of MgO, from 0.1 to 10 wt % of CaO, from 1 to 15 wt % of MgO+CaO, from 0.5 to 10 wt % of $TiO_2$, from 0.5 to 10 wt % of $ZrO_2$, from 0 to 5 wt % of ZnO, and from 0 to 8 wt % of $La_2O_3$. The glass material, or the glass substrate, has uniform composition between at the surface and in the interior and has an amorphous structure. With this design, it is possible to obtain high mechanical strength without strengthening treatment, a linear thermal expansion coefficient close to motor components, and excellent chemical durability.

2 Claims, 1 Drawing Sheet

F I G. 1
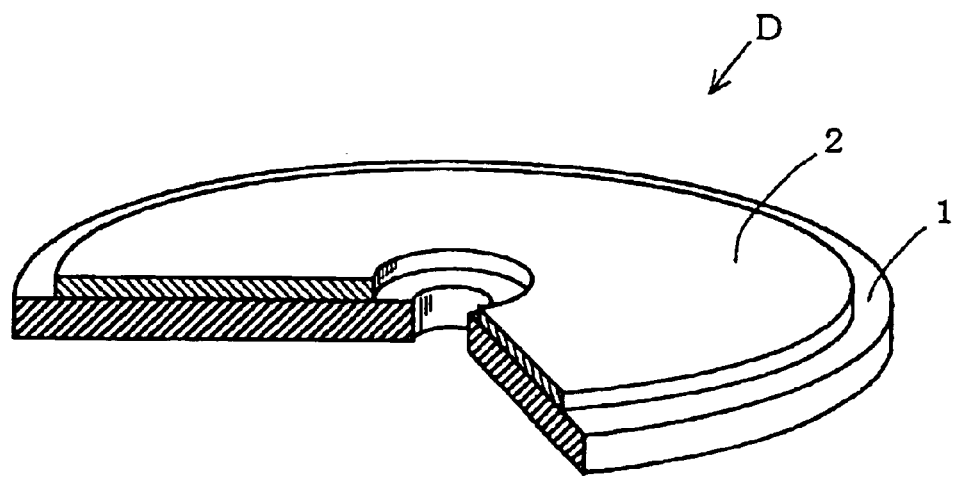

GLASS MATERIAL FOR A SUBSTRATE, GLASS SUBSTRATE, AND INFORMATION RECORDING MEDIUM EMPLOYING THE SAME

This application is a continuation of co-pending U.S. patent application Ser. No. 10/227,287 filed on Aug. 26, 2002. This application is based on Japanese Patent Application No. 2002-166548 filed on Jun. 7, 2002, the contents of which are hereby incorporated by reference.

BACKGROUND OF THE INVENTION

1. Field of the Invention

The present invention relates to a glass material for a substrate (hereinafter referred to simply as a lass material also), to a glass substrate, and to an information recording medium employing the same.

2. Description of the Prior Art

Conventionally, magnetic disks for use in stationary devices such as desk-top computers and servers typically have substrates made of aluminum alloy, and those for use in portable devices such as notebook computers and mobile computers typically have substrates made of glass. However, aluminum alloy is prone to deformation, and is not hard enough to offer satisfactory surface smoothness on the surfaces of a substrate after polishing. Moreover, when a head makes mechanical contact with a magnetic disk, the magnetic film is liable to exfoliate from the substrate. For these reasons, substrates made of glass, which offer satisfactory surface smoothness and high mechanical strength, are expected to be increasingly used in the future not only in portable devices but also in stationary devices and other home-use information devices.

One known type of glass substrate is those made of chemically strengthened glass, in which the alkali elements present near the surface of the substrate are replaced with other alkali elements in order to produce compression strain and thereby increase mechanical strength. However, chemically strengthened glass requires a complicated ion exchange process, and does not permit reprocessing once ion exchange is complete. This makes it difficult to achieve a high yield rate. Moreover, to permit ion exchange to take place in the glass substrate, alkali ions need to be left easily movable therein. Thus, the alkali ions that are present near the surface of the substrate may move to the surface and exude therefrom during the heating step when the magnetic film is formed, or erode the magnetic film, or degrade the bond strength of the magnetic film.

Another type of glass substrate, known as common glass substrates that are not treated by chemical strengthening, is those made of soda lime. However, soda lime is not mechanically strong or chemically durable enough to be suitable as a material for substrates for information recording. Glass materials used in substrates of liquid crystal panels or the like are so prepared as to have a low or no alkali content so that they have low linear thermal expansion coefficients. This helps maintain thermal stability at high temperatures. However, as a result, these materials have linear thermal expansion coefficients that greatly differ from that of, for example, stainless steel (SUS), of which clamps and spindle motor components are made. This often causes trouble when a recording medium is mounted in a recording device or when information is recorded. Moreover, these materials are not mechanically strong enough to be suitable as a material for substrates for information recording.

Glass substrates are used also as substrates in optical communication devices such as optical filters and optical switches. These devices, however, are occasionally degraded by elution of the alkali content from their glass substrate. Moreover, the higher the density of the film formed on a glass substrate, the more the wavelength shifts ascribable to variations in temperature and humidity can be reduced. There is a limit, however, to the density of a film that can be formed by vapor deposition, which is the method widely used conventionally.

SUMMARY OF THE INVENTION

An object of the present invention is to provide a glass material for a substrate and a glass substrate that have high mechanical strength without being treated by strengthening, that have a linear thermal expansion coefficient close to that of motor components, and that have excellent chemical durability. It is to be noted that, in the present specification, a glass material for a substrate denotes glass in the solid state before being polished and cleaned, and that a glass substrate denotes a product obtained by polishing and cleaning such a glass material for a substrate.

Another object of the present invention is to provide a glass material for a substrate and a glass substrate that has low alkali elution and that permits formation of a high-density film.

Still another object of the present invention is to provide an information recording medium that is free from erosion of the magnetic film and degradation of the bond strength of the magnetic film ascribable to alkali ions, that offers excellent mechanical strength and chemical durability, that has a linear thermal expansion coefficient close to that of motor components, that is free from trouble when it is mounted in a recording device or information is recorded thereon, and that offers excellent durability and high recording density.

To achieve the above objects, according to the present invention, a glass material for a substrate is so prepared as to have uniform composition both at the surface and the interior thereof, have an amorphous structure, and fulfill the following conditions:

$$(A/B) \times E \times 10^7 \geq 30 \quad (1)$$

$$A \geq 60 \times 10^{-7} \quad (2)$$

$$B \leq 250 \text{ ppb (per 2.5-inch disk)} \quad (3)$$

$$E \geq 85 \quad (4)$$

where

A represents the linear thermal expansion coefficient (/° C.);

B represents the alkali elution (ppb); and

E represents the Young's modulus (GPa).

Prepared in this way, the glass material for a substrate offers' a high linear thermal expansion coefficient, low alkali elution, high rigidity, and low production costs.

Alternatively, according to the present invention, a glass material for a substrate is so prepared as to contain the following glass ingredients: from 45 to 70 wt % of $SiO_2$, from 1 to 10 wt % of $Al_2O_3$, from 0.5 to 8 wt % of $B_2O_3$, from 7 to 20 wt % of $Li_2O+Na_2O+K_2O$, from 0.1 to 10 wt % of MgO, from 0.1 to 10 wt % of CaO, from 1 to 15 wt % of MgO+CaO, from 0.5 to 10 wt % of $TiO_2$, from 0.5 to 10 wt % of $ZrO_2$, from 0 to 5 wt % of ZnO, and from 0 to 8 wt % of $La_2O_3$. Prepared in this way, the glass material for a substrate has high rigidity without being treated by strengthening, and offers a high linear thermal expansion coefficient, low alkali elution, and low production costs.

To achieve the above objects, according to the present invention, a glass substrate is so prepared as to have uniform composition both at the surface and the interior thereof, have an amorphous structure, and fulfill the conditions (1) to (4) above. Moreover, the glass substrate is produced by undergoing a polishing step and then a cleaning step in which the glass substrate is cleaned with at least one of a pure water liquid, an acidic liquid, and an alkaline liquid. Furthermore, the surface roughness Ra after the polishing step and the surface roughness Ra' after the cleaning step fulfill both of the following conditions:

$$Ra'/Ra \leq 1.5 \quad (5)$$

$$Ra \leq 1.0 \text{ nm} \quad (6)$$

Prepared in this way, the glass substrate offers a high linear thermal expansion coefficient, low alkali elution, high rigidity, and low production costs. Moreover, when used as a substrate for an information recording medium, it offers excellent durability and high recording density.

Alternatively, according to the present invention, a glass substrate is so prepared as to contain the following glass ingredients: from 45 to 70 wt % of $SiO_2$, from 1 to 10 wt % of $Al_2O_3$, from 0.5 to 8 wt % of $B_2O_3$, from 7 to 20 wt % of $Li_2O+Na_2O+K_2O$, from 0.1 to 10 wt % of MgO, from 0.1 to 10 wt % of CaO, from 1 to 15 wt % of MgO+CaO, from 0.5 to 10 wt % of $TiO_2$, from 0.5 to 10 wt % of $ZrO_2$, from 0 to 5 wt % of ZnO, and from 0 to 8 wt % of $La_2O_3$. This glass substrate has uniform composition between at the surface and in the interior and has an amorphous structure. Moreover, the glass substrate is produced by undergoing a polishing step and then a cleaning step in which the glass substrate is cleaned with at least one of a pure water liquid, an acidic liquid, and an alkaline liquid. Furthermore, the surface roughness Ra after the polishing step and the surface roughness Ra' after the cleaning step fulfill both of the conditions (5) and (6) above. Prepared in this way, the glass substrate has high rigidity without being treated by strengthening, and offers a high linear thermal expansion coefficient, low alkali elution, and low production costs. Moreover, when used as a substrate for an information recording medium, it offers excellent durability and high recording density.

According to the present invention, an information recording medium is provided with: a glass substrate; and a magnetic film formed on top of the glass substrate directly or with one or more primer and/or protective layers sandwiched in between. Here, the glass substrate is so prepared as to have uniform composition both at the surface and the interior thereof, have an amorphous structure, and fulfill the conditions (1) to (4) above. Prepared in this way, the information recording medium is free from erosion of the magnetic film and degradation of the bond strength of the magnetic film ascribable to alkali ions, offers excellent mechanical strength and chemical durability, has a linear thermal expansion coefficient close to that of motor components, is free from trouble when it is mounted in a recording device or information is recorded thereon, and offers excellent durability and high recording density.

Alternatively, according to the present invention, an information recording medium is provided with: a glass substrate; and a magnetic film formed on top of the glass substrate directly or with one or more primer and/or protective layers sandwiched in between. Here, the glass substrate is so prepared as to contain the following glass ingredients: from 45 to 70 wt % of $SiO_2$, from 1 to 10 wt % of $Al_2O_3$, from 0.5 to 8 wt % of $B_2O_3$, from 7 to 20 wt % of $Li_2O+Na_2O+K_2O$, from 0.1 to 10 wt % of MgO, from 0.1 to 10 wt % of CaO, from 1 to 15 wt % of MgO+CaO, from 0.5 to 10 wt % of $TiO_2$, from 0.5 to 10 wt % of $ZrO_2$, from 0 to 5 wt % of ZnO, and from 0 to 8 wt % of $La_2O_3$. Prepared in this way, the information recording medium is free from erosion of the magnetic film and degradation of the bond strength of the magnetic film ascribable to alkali ions, offers excellent mechanical strength and chemical durability, has a linear thermal expansion coefficient close to that of motor components, is free from trouble when it is mounted in a recording device or information is recorded thereon, and offers excellent durability and high recording density.

The various values mentioned above are assumed to be measured in the following manners. The linear thermal expansion coefficient A is measured using a differential dilatometer under the following conditions: with a load of 5 g, within a temperature range of from 25 to 100° C., and at a temperature increase rate of 5° C./min. The alkali elution B is determined by first polishing the surface of sample glass with cerium oxide so as to obtain a smooth surface having an Ra value of 2 nm or lower, then cleaning the surface, then immersing the sample glass in 50 ml of reverse osmosis membrane water at 80° C. for 24 hours, and then analyzing the elution liquid with an ICP emission spectrochemical analyzer. Thus, the alkali elution so determined is the sum of Li, Na, and K elution. The sample glass has approximately the same surface area as a substrate of a 2.5-inch disk. The Young's modulus E is measured by the method for testing dynamic modulus of elasticity included in the methods for testing elasticity of fine ceramics defined in JIS (Japanese Industrial Standards) R 1602. It is to be noted that describing a glass material or glass substrate as having uniform composition at the surface and in the interior and having an amorphous structure is equivalent to saying that the glass material or glass substrate is not treated by strengthening. The Vickers hardness Hv is measured using a Vickers hardness tester under the following conditions: with a load of 100 g, and with loading duration of 15 seconds. The liquid phase temperature TL is determined by first keeping sample glass in a molten state at 1,550° C. for 2 hours, then keeping it at 1,300° C. for 10 hours, then cooling it rapidly, and then checking for devitrification at the surface or in the interior of the sample glass. The temperature $Tlog_{\eta=2}$ is the temperature at which $log\eta=2$ while the viscosity of molten sample glass is measured using a stirring viscosity tester. The glass transition point Tg is measured using a differential thermal analyzer while sample glass prepared in the form of powder is heated within a temperature range of from room temperature to 900° C. at a temperature increase rate of 10° C./min. The surface roughness Ra and Ra' of a glass substrate is measured using an atomic force microscope (AFM).

BRIEF DESCRIPTION OF THE DRAWINGS

This and other objects and features of the present invention will become clear from the following description, taken in conjunction with the preferred embodiments with reference to the accompanying drawings in which:

FIG. 1 is a perspective view showing an example of an information recording medium employing a glass substrate according to the invention.

DESCRIPTION OF THE PREFERRED EMBODIMENTS

Hereinafter, embodiments of the present invention will be described with reference to the drawings. Of the four embodiments described below, the first deals with a glass material for a substrate, and the third deals with a glass substrate produced by polishing and cleaning it; the second deals with a glass material for a substrate, and the fourth deals with a glass substrate produced by polishing and cleaning it. Now, these two pairs of a glass material for a substrate and a glass substrate will be described one by one.

First, the glass material of the first embodiment and the glass substrate of the third embodiment will be described. The glass material and the glass substrate of these embodiments are characterized, above all, in that they have predetermined glass properties without being treated by strengthening. First, it is important that the glass material and the glass substrate have a linear thermal expansion coefficient of $60 \times 10^{-7}/°$ C. or higher. With a linear thermal expansion coefficient outside this range, when an information recording medium is produced using the glass substrate, its linear thermal expansion coefficient differs so greatly from that of the material of the driver unit in which the information recording medium is mounted as to produce stress around where the information recording medium is mounted. As a result, the substrate may break or deform, causing deviations in recording positions and thus making reading and writing of data impossible. A further preferred lower limit of the linear thermal expansion coefficient is $62 \times 10^{-7}/°$ C., and a preferred higher limit thereof is $90 \times 10^{-7}/°$ C.

It is also important that the glass material and the glass substrate of the first and third embodiments have alkaline elution of 250 ppb or lower per 2.5-inch disk. With alkali elution higher than 250 ppb, when an glass substrate is produced using the glass material, and then a recording film is formed on the glass substrate to produce an information recording medium, the recording film, such as a magnetic film, formed on the surface of the glass substrate is degraded by elution of the alkali content from the glass substrate. Further preferred alkali elution is 230 ppb or lower.

In the glass material and the glass substrate of the first and third embodiments, which have uniform composition at the surface and in the interior and have an amorphous structure, since their mechanical strength depends on the rigidity of their material, it is also important that they have a Young's modulus of 85 GPa or higher. With a Young's modulus lower than 85 GPa, it is impossible to obtain sufficient mechanical strength. As a result, when a HDD (hard disk drive) incorporating an information recording medium produced using them receives an external shock, the information recording medium is liable to break at where it is joined to components of the HDD. A further preferred Young's modulus is 87 GPa or higher.

It is also important that the glass material and the glass substrate of the first and third embodiments, in addition to meeting the requirements for the desired properties described above, fulfill the condition (1) noted earlier. If the condition (1) is not fulfilled, even when the requirements for the desired properties described above are met, it is impossible to strike a proper balance among various properties, leading to problems in actual production, such as low productivity in the melt molding step and extremely low productivity in the polishing, cleaning, and shaping steps. A preferred value of the left side of the condition (1) is 33 or higher, and a preferred upper limit thereof is 70.

A glass material and a glass substrate having glass properties as described above can be prepared by blending appropriate kinds of glass ingredients in appropriate proportions. For example, the desired properties described above can be achieved by blending the same glass ingredients in the same proportions as for the glass material of the second embodiment, which will be described later.

In a case where the glass substrate of the third embodiment is used in, for example, an information recording medium, to minimize the floating distance of the head and the film thickness of the recording medium, it is preferable that the glass substrate have, after the polishing step, a surface roughness Ra of 1 nm or lower and, after the cleaning step, a surface roughness Ra' equal to or lower than 1.5 times the surface roughness Ra. With a glass material that is treated by strengthening, it is possible to obtain a surface roughness Ra of 1 nm or lower by polishing, but, when the surface of the substrate is cleaned with water, an acid, or an alkali in the following cleaning step, owing to its low chemical durability, its surface is violently eroded, resulting in a high surface roughness Ra' after the cleaning step. On the other hand, with a glass material that is not treated by strengthening, its composition is uniform between at the surface and in the interior, and therefore, in general, the surface roughness Ra' of the substrate does not change so much during the cleaning step. Accordingly, by optimizing the glass ingredients, it is possible to control the surface roughness Ra' after the cleaning step within 1.5 times the surface roughness Ra after the polishing step.

To give the recording surface sufficient shock resistance, and to prevent it from being damaged in the production process, it is preferable that the glass material of the first embodiment have a Vickers hardness Hv of 550 or higher. A Vickers hardness in this range can be obtained by adjusting the proportions of the glass ingredients in such a way as to increase the ion fill factor of the glass without degrading the main properties desired.

For satisfactory productivity in the melt molding step and out of other considerations, in the glass substrate of the third embodiment, it is preferable that the liquid phase temperature $T_L$ be 1,300° C. or lower, that the temperature $T_{log\eta=2}$ at which the glass has a melt viscosity of $log\eta=2$ be 1,450° C. or lower, and that the glass transition point Tg be 600° C. or lower. The liquid phase temperature, $T_{log\eta=2}$, and the glass transition temperature can be controlled within these ranges in the following manner. For example, the liquid phase temperature of the glass can be controlled by adjusting the total content and proportions of ingredients of which the addition in excess amounts makes the glass unstable. $T_{log\eta=2}$ can be controlled by adjusting the proportions in which $SiO_2$, i.e., the main ingredient that increases the viscosity, and other ingredients that improve the viscosity are added. The glass transition temperature is controlled by adjusting the total content and proportions of the skeletal ingredients $SiO_2$, $B_2O_3$, and $Al_2O_3$ and the content of alkali metal oxides, i.e., the ingredients that greatly reduce the glass transition temperature, in such a way as not to degrade the main properties desired.

The glass substrate of the third embodiment can be used to produce disks of any diameter, for example 3.5-inch, 2.5-inch, 1.8-inch, and any smaller-diameter disks, with any thickness, for example 2 mm thick, 1 mm thick, 0.63 mm thick, and any slimmer disks.

Next, the glass material of the second embodiment and the glass substrate of the fourth embodiment will be described. The inventor of the present invention has made an intensive study in search of a way of increasing the rigidity of a glass substrate without treating it by strengthening, increasing the linear thermal expansion coefficient thereof than ever while reducing the alkali elution therefrom, and enhancing the chemical durability thereof. The study has led the inventor to find out that it is possible to obtain predetermined rigidity by using silicon oxide as the matrix ingredient of glass and adding thereto particular ingredients such as MgO and CaO, and also that it is possible to obtain a high linear thermal expansion coefficient while reducing alkali elution by controlling the total content of predetermined alkali metal oxides within a predetermined range. These findings have led to the present invention.

Now, the reasons that the glass material of the second embodiment and the glass substrate of the fourth embodiment are prepared from specified ingredients will be described. First of all, $SiO_2$ is an ingredient that forms the matrix of glass. With a $SiO_2$ content less than 45%, the glass has an unstable structure. This not only degrades the chemical durability of the glass, but also degrades the melt viscosity properties thereof, making the glass difficult to mold. On the other hand, with a $SiO_2$ content higher than 70%, the glass shows low fusibility. This lowers productivity and makes it impossible to obtain sufficient rigidity. Hence, a preferred range of the $SiO_2$ content is from 45 to 70%. A further preferred range is 50 to 65%.

$Al_2O_3$ gets into the matrix of glass, and serves to stabilize the structure of the glass and enhance the chemical durability thereof. With an $Al_2O_3$ content lower than 1%, the glass structure is not stabilized sufficiently. On the other hand, with an $Al_2O_3$ content higher than 10%, the glass shows low fusibility, lowering productivity. Hence, a preferred range of the $Al_2O_3$ content is from 1 to 10%. A further preferred range is 2 to 8%.

$B_2O_3$ improves the fusibility of glass and thereby enhances productivity. In addition, it gets into the matrix of the glass, and serves to stabilize the structure of the glass and enhance the chemical durability thereof. With a $B_2O_3$ content lower than 0.5%, the fusibility is not improved sufficiently, and the matrix is not stabilized sufficiently. On the other hand, with a $B_2O_3$ content higher than 8%, the glass shows poor melt viscosity properties. This makes the glass difficult to mold, and makes it impossible to obtain sufficient rigidity. Hence, a preferred range of the $B_2O_3$ content is from 0.5 to 8%. A further preferred range is 1 to 6%.

Alkali metal oxides $R_2O$ (R=Li, Na, and K) improve the fusibility of glass, and increase the linear thermal expansion coefficient thereof. With a total alkali metal oxide content lower than 7%, the fusibility is not improved sufficiently, nor is the linear thermal expansion coefficient increased sufficiently. On the other hand, with a total alkali metal oxide content higher than 20%, excess amounts of alkali metal oxides are dispersed throughout the skeleton of the glass, increasing alkali elution. Hence, a preferred range of the total alkali metal oxide content is from 7 to 20%. A further preferred range is 8 to 15%. Moreover, to obtain a so-called mixed alkali effect, which helps reduce alkali elution, it is preferable that the content of each alkali metal oxide be 0.5 or higher.

MgO increases the rigidity of glass and improves the fusibility thereof. With a MgO content lower than 0.1%, the rigidity is not increased sufficiently, nor is the fusibility improved sufficiently. On the other hand, with a MgO content higher than 10%, the glass has an unstable structure, lowering the melt productivity and the chemical durability of the glass. Hence, a preferred range of the MgO content is from 0.1 to 10%. A further preferred range is 0.5 to 8%.

CaO increases the linear thermal expansion coefficient and the rigidity of glass, and improves the fusibility thereof. With a CaO content lower than 0.1%, the linear thermal expansion coefficient and the rigidity are not increased sufficiently, nor is the fusibility improved sufficiently. On the other hand, with a CaO content higher than 10%, the glass has an unstable structure, lowering the melt productivity and the chemical durability of the glass. Hence, a preferred range of the MgO content is from 0.1 to 10%. A further preferred range is 0.5 to 8%.

A preferred range of the total content of MgO and CaO is from 1 to 15%. This is because, if this total content is lower than 1%, the rigidity is not increased sufficiently, nor is the fusibility improved sufficiently, and because, on the other hand, if this total content is higher than 15%, the glass has an unstable structure, lowering the melt productivity and the chemical durability of the glass. A further preferred range is 2 to 12%.

$TiO_2$ strengthens the structure of glass, enhances the rigidity thereof, and improves the fusibility thereof. With a $TiO_2$ content lower than 0.5%, the rigidity is not enhanced sufficiently, nor is the fusibility improved sufficiently. On the other hand, with a $TiO_2$ content higher than 10%, the glass has an unstable structure, lowering the melt productivity and the chemical durability of the glass. Hence, a preferred range of the $TiO_2$ content is from 0.5 to 10%. A further preferred range is 1 to 8%.

$ZrO_2$ strengthens the structure of glass, enhances the rigidity thereof, and enhances the chemical durability thereof. With a $TiO_2$ content lower than 0.5%, the rigidity is not enhanced sufficiently, nor is the chemical durability enhanced sufficiently. On the other hand, with a $ZrO_2$ content higher than 10%, the glass shows low fusibility, making it impossible to enhance productivity. Hence, a preferred range of the $Zro_2$ content is from 0.5 to 10%. A further preferred range is 1 to 8%.

ZnO increases the chemical durability and the rigidity of glass, and improves the fusibility thereof. With a ZnO content higher than 5%, the glass has an unstable structure, lowering the melt productivity and the chemical durability of the glass. Hence, a preferred ZnO content is 5% or lower. A further preferred ZnO content is 4% or lower.

$La_2O_3$ strengthens the structure of glass and enhances the rigidity thereof. With a $La_2O_3$ content higher than 8%, the glass has an unstable structure, lowering the melt productivity and the chemical durability of the glass. Hence, a preferred $La_2O_3$ content is 8% or lower. A further preferred ZnO content is 6% or lower. For higher rigidity, instead of $La_2O_3$, it is possible to use $Ta_2O_5$, $Nb_2O_5$, $Y_2O_3$, or an oxide of a lanthanoid other than La. However, any of these compounds is expensive compared with $La_2O_3$, and therefore, from the viewpoint of production costs, it is preferable to use only a small amount of it.

For higher fusibility, less than 5% of each of SrO and BaO may be added to a glass material or glass substrate according to the invention. Moreover, 2% or less of a clarifier such as $Sb_2O_3$ may also be added. As required, any other conventionally known glass ingredient or additive may be added so long as it does not spoil the effects achieved by the present invention.

A glass material and a glass substrate according to the invention are produced by any conventionally known production process, for example in the following manner. Raw materials of glass ingredients, i.e., oxides, carbonates, nitrates, hydroxides, and the like corresponding to the individual ingredients, are, in the desired proportions and in the form of powder, fully mixed to obtain a blending of the raw materials. This blending is then put, for example, in a platinum crucible placed inside an electric furnace heated to 1,300 to 1,550° C., where the blending is first melted and clarified and then stirred and homogenized. The molten glass is then poured into a preheated mold, and is cooled slowly so as to be formed into a glass block. Next, the glass block is heated again to close to its glass transition point and is then cooled slowly so as to be straightened. The glass block thus obtained is then sliced into a disk, and is cut out using a core drill so as to have concentric outer and inner edges. Alternatively, the molten glass is formed into a disk by press molding. The disk-shaped glass material thus obtained is then formed into a glass substrate by subjecting the two flat surfaces of the glass material to coarse and fine polishing and then to cleaning using at least one of a water liquid, an acidic liquid, or an alkaline liquid.

In a case where a glass substrate according to the invention is used in, for example, an information recording medium, to minimize the floating distance of the head and the film thickness of the recording medium, it is preferable that the glass substrate have, after the polishing step, a surface roughness Ra of 1 nm or lower and, after the cleaning step, a surface roughness Ra equal to or lower than 1.5 times the surface roughness Ra. With a glass material that is treated by strengthening, it is possible to obtain a surface roughness Ra of 1 nm or lower by polishing, but, when the surface of the substrate is cleaned with water, an acid, or an alkali in the following cleaning step, owing to its low chemical durability, its surface is violently eroded, resulting in a high surface roughness Ra' after the cleaning step. On the other hand, with a glass material that is not treated by strengthening, its composition is uniform between at the surface and in the interior, and therefore, in general, the surface roughness Ra' of the substrate does not change so much during the cleaning step. Accordingly, by optimizing the glass ingredients, it is possible to control the surface roughness Ra' after the cleaning step within 1.5 times the surface roughness Ra after the polishing step.

To give the recording surface sufficient shock resistance, and to prevent it from being damaged in the production process, it is preferable that the glass substrate of the fourth embodiment have a Vickers hardness Hv of 550 or higher. A Vickers hardness in this range can be obtained by adjusting the proportions of the glass ingredients in such a way as to increase the ion fill factor of the glass without degrading the main properties desired.

For satisfactory productivity in the melt molding step and out of other considerations, in the glass substrate of the fourth embodiment, it is preferable that the liquid phase temperature $T_L$ be 1,300° C. or lower, that the temperature $T_{log\eta=2}$, at which the glass has a melt viscosity of $log\eta=2$ be 1,450° C. or lower, and that the glass transition point Tg be 600° C. or lower. The liquid phase temperature, $T_{log\eta=2}$, and the glass transition temperature can be controlled within these ranges in the following manner. For example, the liquid phase temperature of the glass can be controlled by adjusting the total content and proportions of ingredients of which the addition in excess amounts makes the glass unstable. $T_{log\eta=2}$ can be controlled by adjusting the proportions in which $SiO_2$, i.e., the main ingredient that increases the viscosity, and other ingredients that improve the viscosity are added. The glass transition temperature is controlled by adjusting the total content and proportions of the skeletal ingredients $SiO_2$, $B_2O_3$, and $Al_2O_3$ and the content of alkali metal oxides, i.e., the ingredients that greatly reduce the glass transition temperature, in such a way as not to degrade the main properties desired.

The glass substrate of the fourth embodiment can be used to produce disks of any diameter, for example 3.5-inch, 2.5-inch, 1.8-inch, and any smaller-diameter disks, with any thickness, for example 2 mm thick, 1 mm thick, 0.63 mm thick, and any slimmer disks.

Next, an information recording medium employing a glass substrate according to the invention will be described. When employed as a substrate of an information recording medium, a glass substrate according to the invention contributes to durability and high-recording density. Now, such an information recording medium will be described with reference to the drawing.

FIG. 1 is a perspective view of a magnetic disk. This magnetic disk D is composed of a circular glass substrate 1 and a magnetic film 2 formed directly on a surface thereof. The magnetic film 2 may be formed by any conventionally known method. For example, it is formed by spin-coating the substrate with a thermosetting resin having magnetic particles dispersed therein, or by sputtering, or by electroless plating. Spin-coating provides a film thickness of about 0.3 to 1.2 mm, sputtering provides a film thickness of about 0.04 to 0.08 mm, and electroless plating provides a film thickness of about 0.05 to 0.1 mm. To minimize the film thickness and maximize the density, it is preferable to form the magnetic film 2 by sputtering or electroless plating.

The magnetic film may be formed out of any conventionally known magnetic material, of which a preferred example is a Co-based alloy that contains Co, which exhibits high crystal anisotropy, as its main ingredient so as to have high coercivity and that has Ni and Cr added thereto to adjust remanent magnetic flux density. Specifically, examples of such alloys containing Co as their main ingredient include CoPt, CoCr, CoNi, CoNiCr, CoCrTa, CoPtCr, CoNiPt, CoNiCrPt, CoNiCrTa, CoCrPtTa, CoCrPtB, and CoCrPt-SiO. The magnetic film may be divided into a plurality of layers with one or more non-magnetic films (for example, Cr, CrMo, or CrV) laid in between so as to form a multilayer structure (for example, CoPtCr/CrMo/CoPtCr or CoCrPtTa/CrMo/CoCrPtTa). Instead of the magnetic materials mentioned above, it is also possible to use a magnetic material of a granular type having magnetic particles of Fe, Co, FeCo, CoNiPt, or the like dispersed in a non-magnetic film of a ferrite-based material, an iron/rare earth-based material, $SiO_2$, BN, or the like. The magnetic film may be for either surface recording or vertical recording.

To ensure smooth sliding of a magnetic head, the magnetic film may be coated with a thin layer of lubricant on the surface. An example of the lubricant is perfluoro polyether (PFPE), a liquid lubricant, diluted with a CFC-based solvent.

As required, a primer or protective layer may additionally be formed. In a magnetic disk, the material of the primer layer is selected according to the magnetic film. The primer layer is formed out of, for example, one or more selected from non-magnetic metals such as Cr, Mo, Ta, Ti, W, V, B, Al, and Ni. With a magnetic film containing Co as its main ingredient, Cr used singly or a Cr alloy is preferred for better magnetic properties and out of other considerations. The primer layer may be composed of a single layer, or may be composed of a plurality of layers of identical or different types laid over one another to form a multilayer primer layer such as Cr/Cr, Cr/CrMo, Cr/CrV, NiAl/Cr, NiAl/CrMo, or NiAl/CrV.

The protective layer for preventing wear and corrosion of the magnetic film may be a layer of Cr, Cr alloy, carbon, hydrogenated carbon, zirconia, silica, or the like. Such a protective layer can be formed in continuous steps with the primer layer, the magnetic film, and the like using an in-line-type sputtering machine. The protective layer may be composed of a single layer, or may be composed of a plurality of layers of identical or different types laid over one another to form a multilayer protective layer. It is also possible to form, on top of or instead of the protective layer described above, another protective layer. For example, instead of the protective layer described above, a layer of silicon oxide ($SiO_2$) may be formed by applying, on top of a Cr layer, and then burning fine particles of colloidal silica dispersed in tetraalkoxysilane diluted with an alcohol-based solvent.

A magnetic disk has been described above as an example of an information recording medium according to the invention. It is to be understood, however, that a glass substrate according to the invention applies not only to this type of information recording medium but also to magneto-optical disks, optical disks, and the like.

Moreover, a glass substrate according to the invention is suitably used also in optical communication devices. A glass substrate according to the invention has alkali elution as low as 250 ppb or lower per 2.5-inch disk, and therefore the film formed thereon is not degraded by elution of the alkali content therefrom. Moreover, compared with conventional glass substrates, a glass substrate according to the invention has a linear thermal expansion coefficient as high as $60 \times 10^{-7}/°$ C. or higher, and therefore, when the glass substrate heated in the vapor deposition step is cooled, it shrinks more, compressing the film formed on the surface thereof more and thereby increasing the density of the film. This helps alleviate the wavelength shifts resulting from variations in temperature and humidity.

Now, an optical filter for dense wavelength division multiplexing (DWDM) will be described as an example of an optical communication device employing a glass substrate according to the invention. An optical filter employing a dielectric multilayer film has high-refractive-index layers and low-refractive-index layers laid over one another. These layers are formed by any conventionally known method, examples of which include vacuum deposition, sputtering, ion plating, and ion beam assisted deposition. Among these methods, vacuum deposition is preferred for the high productivity it provides. Vapor deposition is a method of forming a thin film by heating a material to be evaporated in a vacuum and making the resulting vapor condense on and adhere to a base substrate. The material to be evaporated is heated by one of various methods such as by resistance heating, in an externally heated crucible, with an electron beam, with microwaves, or with a laser beam. Specifically, the material is evaporated in a vacuum of about $1 \times 10^{-3}$ to $5 \times 10^{-3}$ Pa. While the material is being evaporated, the amount of oxygen introduced is adjusted by controlling a solenoid valve so that the degree of vacuum is kept constant. The thickness of each film so formed is monitored so that evaporation is stopped when the desired film thickness is obtained.

There is no particular restriction on the thickness of individual films, but each film is routinely given a thickness equal to one-fourth of the wavelength, generally up to 1 mm. The total number of films generally exceeds 100. The films are formed out of, for example, a dielectric, semiconductor, or metal, among which a dielectric is particularly preferred.

An optical filter for DWDM has been described above as an example of an optical communication device employing a glass substrate according to the invention. It is to be understood, however, that a glass substrate according to the invention applies not only to this type of optical communication device but also to other types of optical communication device such as optical switches and multiplexing/branching devices.

EXAMPLES

Practical Examples 1 to 59 and Comparative Examples 1 to 11

For each of various glass materials of different composition, which each correspond to one of Practical Examples 1 to 59 and Comparative Examples 1 to 11, a prescribed amount of raw material powder was weighed and put in a platinum crucible, was mixed, and then was melted at 1,550° C. in an electric furnace. When the material is melted sufficiently, stirring blades were put into the molten glass to stir it for about one hour. Thereafter, the stirring blades were taken out, then the molten glass was allowed to stand for 30 minutes, and then it was poured into a mold so as to be formed into a glass block. The glass block was then heated again to close to its glass transition point, and was then cooled slowly so as to be straightened. The glass block thus obtained was then sliced into a disk about 1.5 mm thick and 2.5 inches across, and was cut out using a cutter so as to have concentric inner and outer edges. The two flat surfaces of this disk were subjected to coarse and fine polishing and then to cleaning to obtain a glass substrate of the corresponding Practical or Comparative Example. With each of the glass substrates thus produced, its properties were evaluated in the manners described below. The composition of the glass substrate of each example and the results obtained therewith are shown in Tables 1 to 6.

Linear Thermal Expansion Coefficient A

The linear thermal expansion coefficient A was measured using a differential dilatometer under the following conditions: with a load of 5 g, within a temperature range of from 25 to 100° C., and at a temperature increase rate of 5° C./min.

Alkali Elution B

The alkali elution B was determined by first polishing the surface of the glass substrate with cerium oxide so as to obtain a smooth surface having an Ra value of 2 nm or lower, then cleaning the surface, then immersing the glass substrate in 50 ml of reverse osmosis membrane water at 80° C. for 24 hours, and then analyzing the elution liquid with an ICP emission spectrochemical analyzer.

Young's Modulus E

The Young's modulus E was measured by the method for testing dynamic modulus of elasticity included in the methods for testing elasticity of fine ceramics defined in JIS (Japanese Industrial Standards) R 1602.

Glass Transition Point Tg

The glass transition point Tg was measured using a differential thermal analyzer while the glass material prepared in the form of powder was heated within a temperature range of from room temperature to 900° C. at a temperature increase rate of 10° C./min.

Vickers Hardness Hv

The Vickers hardness Hv was measured using a Vickers hardness tester under the following conditions: with a load of 100 g, and with loading duration of 15 seconds.

Liquid Phase Temperature $T_L$

The liquid phase temperature $T_L$ was determined by first keeping the glass material in a molten state at 1,550° C. for 2 hours, then keeping it at 1,300° C. for 10 hours, then cooling it rapidly, and then checking for devitrification at the surface or in the interior of the glass material. A glass material is evaluated as "OK" if no devitrification was observed therewith and as "NG" if devitrification was observed therewith.

Temperature $T_{log\eta=2}$

The viscosity of the molten glass was measured using a stirring viscosity tester, and the temperature $T_{log\eta=2}$ at which log η=2 was determined. A glass material is evaluated as "OK" if $T_{log\eta=2}$ was 1,450° C. or lower and as "NG" if $T_{log\eta=2}$ was higher than 1,450° C.

Surface Roughness

The surface of the glass substrate was polished for one hour using cerium oxide as an abrasive and hard urethane as a polishing pad. Next, the glass substrate in a wet state as it was just after the polishing is subjected to supersonic cleaning using pure water. The surface of the glass substrate was then observed using an AFM (atomic force microscope, the model "D3100 System" manufactured by Digital Instruments) to measure the surface roughness Ra after the polishing step. The measured area was a field of view of 10 μm×10 μm, and measurements were made at 5 points on each glass substrate. Next, the polished glass substrate described above was immersed in a 5 wt % water solution of sodium hydroxide at 50° C. for 10 minutes, and was then subjected to supersonic cleaning using pure water. Then, in the same manner as described above, the surface roughness Ra' of the glass substrate was measured using the AFM.

Tables 1 to 4 show the following. The glass substrates of Practical Examples 1 to 59 had linear thermal expansion coefficients in the range of 62×10$^{-7}$/° C. or higher, i.e., higher than with conventional glass substrates, had alkali elution of 235 ppb or lower, i.e., lower than with conventional glass substrates, and had Young's moduli of 85 GPa or higher, i.e., quite satisfactory in practical terms. Moreover, all these glass substrates exhibited good fusibility.

Table 5 shows the following. The glass substrate of Comparative Example 1, of which the SiO$_2$ content was as low as 42.9%, had a weak glass structure, and exhibited a decrease in the Young's modulus as alkali elution increased. Moreover, devitrification was observed in the glass. The glass substrate of Comparative Example 2, of which the SiO$_2$ content was as high as 72.1%, had a low linear thermal expansion coefficient and a low Young's modulus. The glass substrate of Comparative Example 3, of which the Al$_2$O$_3$ content was as high as 12.9% and of which the B$_2$O$_3$ content was as high as 8.8%, and the glass substrate of the Comparative Example 4, of which the Al$_2$O$_3$ content was as high as 16.9%, both had a low linear thermal expansion coefficient and a low Young's modulus. Moreover, the temperature $T_{log\eta=2}$ was high, resulting in poor fusibility of the glass.

The glass substrate of Comparative Example 5, of which the B$_2$O$_3$ content was as high as 13.8%, had a low linear thermal expansion coefficient, high alkali elution, a low Young's modulus, and a low Vickers hardness. By contrast, the glass substrate of Comparative Example 6, which had no B$_2$O$_3$ content, had high alkali elution. The glass substrate of Comparative Example 7, which had no Al$_2$O$_3$ content, suffered devitrification, and thus did not vitrify. The glass substrate of Comparative Example 8, of which the CaO content was as high as 12.3%, had high alkali elution and a low Vickers hardness. Moreover, devitrification was observed in the glass. The glass substrate of Comparative Example 9, of which the MgO content was as high as 12.3%, had high alkali elution, and devitrification was observed in the glass. The glass substrate of Comparative Example 10, of which the ZrO$_2$ content was as high as 13.5%, showed unmelted matter when the glass was melted. The glass substrate of Comparative Example 11, of which the TiO$_2$ content was as high as 13.0%, had high alkali elution, and devitrification was observed in the glass.

Table 6 shows the following. With the glass substrates of all of Practical and Comparative Examples, the surface roughness Ra after the polishing step was 1.0 nm or lower. However, after cleaning with a solution of sodium hydroxide, whereas the glass substrates of Practical Examples yielded satisfactory Ra'/Ra values of 1.3 or lower, the glass substrate of Comparative Example 1 yielded an Ra'/Ra value of 1.9, meaning that the surface roughness Ra' after the cleaning step was unacceptably high in practical terms.

TABLE 1

| Glass Ingredients | Practical Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| SiO$_2$ | 46.5 | 49.9 | 60.1 | 65.1 | 68.1 | 56.1 | 58.6 | 59.2 | 59.2 | 59.2 | 59.2 | 59.2 | 59.2 |
| Al$_2$O$_3$ | 9.1 | 9.1 | 5.1 | 5.1 | 3.1 | 5.6 | 4.1 | 7.3 | 7.3 | 9.3 | 5.0 | 3.3 | 1.3 |
| B$_2$O$_3$ | 4.4 | 4.4 | 3.6 | 3.6 | 3.6 | 3.9 | 2.9 | 5.0 | 1.0 | 3.0 | 7.3 | 7.0 | 7.0 |
| Li$_2$O | 4.3 | 4.3 | 3.7 | 3.7 | 3.7 | 4.1 | 4.1 | 3.4 | 3.4 | 3.4 | 3.4 | 3.4 | 3.4 |
| Na$_2$O | 3.4 | 3.4 | 4.1 | 4.1 | 4.1 | 4.5 | 4.5 | 3.8 | 3.8 | 3.8 | 3.8 | 3.8 | 3.8 |
| K$_2$O | 7.3 | 7.3 | 2.0 | 2.0 | 2.0 | 2.3 | 2.3 | 1.9 | 1.9 | 1.9 | 1.9 | 1.9 | 1.9 |
| R$_2$O | 15.0 | 15.0 | 9.8 | 9.8 | 9.8 | 10.8 | 10.8 | 9.2 | 9.2 | 9.2 | 9.2 | 9.2 | 9.2 |
| MgO | 3.6 | 3.4 | 3.9 | 3.9 | 3.9 | 4.3 | 4.3 | 4.4 | 4.4 | 4.4 | 4.4 | 4.4 | 4.4 |
| CaO | 3.4 | 0.2 | 5.7 | 3.7 | 3.7 | 6.3 | 6.3 | 4.4 | 4.4 | 4.4 | 4.4 | 4.4 | 4.4 |
| SrO | | | | | | | | | | | | | |
| BaO | | | | | | | | | | | | | |
| ZnO | 3.6 | 3.6 | | | | | | | 2.0 | | | | 2.0 |
| ZrO$_2$ | 6.3 | 6.3 | 6.7 | 3.7 | 3.7 | 7.4 | 7.4 | 5.5 | 5.5 | 5.5 | 5.5 | 5.5 | 5.5 |
| TiO$_2$ | 3.6 | 3.6 | 3.2 | 3.2 | 2.2 | 3.5 | 3.5 | 3.6 | 3.6 | 3.6 | 3.6 | 3.6 | 3.6 |
| La$_2$O$_3$ | 4.3 | 4.3 | 1.7 | 1.7 | 1.7 | 1.9 | 1.9 | 1.4 | 3.4 | 1.4 | 1.4 | 3.4 | 3.4 |
| Y$_2$O$_3$ | | | | | | | | | | | | | |
| CeO$_2$ | | | | | | | | | | | | | |
| Gd$_2$O$_3$ | | | | | | | | | | | | | |
| Er$_2$O$_3$ | | | | | | | | | | | | | |
| Nb$_2$O$_5$ | | | | | | | | | | | | | |
| Ta$_2$O$_5$ | | | | | | | | | | | | | |
| Sb$_2$O$_3$ | 0.2 | 0.2 | 0.3 | 0.3 | 0.3 | 0.3 | 0.3 | 0.2 | 0.2 | 0.2 | 0.2 | 0.2 | 0.2 |
| Expansion Coefficient A (×10$^{-7}$/° C.) | 81 | 75 | 66 | 63 | 62 | 71 | 72 | 64 | 65 | 63 | 66 | 64 | 65 |

TABLE 1-continued

| Glass Ingredients | Practical Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Alkali Elution B (ppb) | 224 | 201 | 124 | 111 | 107 | 149 | 152 | 110 | 116 | 108 | 120 | 110 | 116 |
| Young's Modulus E (GPa) | 90 | 87 | 90 | 87 | 85 | 93 | 92 | 88 | 90 | 89 | 86 | 90 | 90 |
| (A/B) * E | 33 | 33 | 48 | 49 | 49 | 45 | 44 | 51 | 51 | 52 | 47 | 52 | 51 |
| Tg | 509 | 517 | 548 | 552 | 536 | 546 | 532 | 547 | 543 | 548 | 538 | 536 | 533 |
| Hv | 615 | 625 | 660 | 645 | 630 | 670 | 660 | 630 | 650 | 640 | 620 | 630 | 630 |
| $T_L$ | ○ | ○ | ○ | ○ | ○ | ○ | ○ | ○ | ○ | ○ | ○ | ○ | ○ |
| $T_{log\eta=2}$ | ○ | ○ | ○ | ○ | ○ | ○ | ○ | ○ | ○ | ○ | ○ | ○ | ○ |

TABLE 2

| Glass Ingredients | Practical Example | | | | | | | | | | | | | | |
|---|---|---|---|---|---|---|---|---|---|---|---|---|---|---|---|
| | 14 | 15 | 16 | 17 | 18 | 19 | 20 | 21 | 22 | 23 | 24 | 25 | 26 | 27 | 28 |
| $SiO_2$ | 53.1 | 53.1 | 53.1 | 53.1 | 53.1 | 53.1 | 53.1 | 53.1 | 53.1 | 53.1 | 53.1 | 53.1 | 53.1 | 53.1 | 53.1 |
| $Al_2O_3$ | 5.6 | 5.6 | 5.6 | 5.6 | 5.6 | 5.6 | 5.6 | 5.6 | 5.6 | 5.6 | 5.6 | 5.6 | 5.6 | 5.6 | 5.6 |
| $B_2O_3$ | 3.9 | 3.9 | 3.9 | 3.9 | 3.9 | 3.9 | 3.9 | 3.9 | 3.9 | 3.9 | 3.9 | 3.9 | 3.9 | 3.9 | 3.9 |
| $Li_2O$ | 4.1 | 4.0 | 6.0 | 1.0 | 4.0 | 3.0 | 6.0 | 6.5 | 4.1 | 4.1 | 4.1 | 4.1 | 4.1 | 4.1 | 4.1 |
| $Na_2O$ | 4.5 | 4.0 | 3.0 | 5.0 | 5.8 | 3.0 | 5.0 | 5.8 | 4.5 | 4.5 | 4.5 | 4.5 | 4.5 | 4.5 | 4.5 |
| $K_2O$ | 2.3 | 2.8 | 1.8 | 4.8 | 1.0 | 1.5 | 4.0 | 7.0 | 2.3 | 2.3 | 2.3 | 2.3 | 2.3 | 2.3 | 2.3 |
| $R_2O$ | 10.8 | 10.8 | 10.8 | 10.8 | 10.8 | 7.5 | 15.0 | 19.3 | 10.8 | 10.8 | 10.8 | 10.8 | 10.8 | 10.8 | 10.8 |
| MgO | 4.3 | 4.3 | 4.3 | 4.3 | 4.3 | 4.5 | 4.5 | 4.5 | 4.3 | 7.3 | 9.3 | 4.3 | 4.3 | 4.3 | 4.3 |
| CaO | 6.3 | 6.3 | 6.3 | 6.3 | 6.3 | 6.3 | 4.3 | 2.3 | 9.3 | 3.3 | 6.3 | 6.3 | 6.3 | 6.3 | 6.3 |
| SrO | | | | | | | | | | | | | 2.0 | | 2.0 |
| BaO | | | | | | | | | | | | | 2.0 | 2.0 | |
| ZnO | | | | | | | | | | | | 1.9 | | 2.0 | 2.0 |
| $ZrO_2$ | 7.4 | 7.4 | 7.4 | 7.4 | 7.4 | 7.4 | 4.9 | 4.9 | 6.4 | 7.4 | 4.4 | 7.4 | 4.4 | 5.4 | 4.4 |
| $TiO_2$ | 6.5 | 6.5 | 6.5 | 6.5 | 6.5 | 6.5 | 3.5 | 3.5 | 4.5 | 6.5 | 4.5 | 6.5 | 4.5 | 4.5 | 4.5 |
| $La_2O_3$ | 1.9 | 1.9 | 1.9 | 1.9 | 1.9 | 4.9 | 4.9 | 2.9 | 1.9 | 1.9 | 1.9 | | 2.8 | 1.9 | 2.8 |
| $Y_2O_3$ | | | | | | | | | | | | | | | |
| $CeO_2$ | | | | | | | | | | | | | | | |
| $Gd_2O_3$ | | | | | | | | | | | | | | | |
| $Er_2O_3$ | | | | | | | | | | | | | | | |
| $Nb_2O_5$ | | | | | | | | | | | | | | | |
| $Ta_2O_5$ | | | | | | | | | | | | | | | |
| $Sb_2O_3$ | 0.3 | 0.3 | 0.3 | 0.3 | 0.3 | 0.3 | 0.3 | | 0.3 | 0.3 | 0.3 | 0.3 | 0.3 | 0.3 | 0.3 |
| Expansion Coefficient A ($\times 10^{-7}$/°C.) | 72 | 71 | 70 | 73 | 72 | 63 | 79 | 82 | 75 | 69 | 73 | 68 | 78 | 74 | 75 |
| Alkali Elution B (ppb) | 140 | 148 | 144 | 156 | 152 | 100 | 201 | 235 | 165 | 140 | 156 | 136 | 176 | 160 | 164 |
| Young's Modulus E (GPa) | 94 | 94 | 95 | 93 | 94 | 94 | 90 | 87 | 91 | 94 | 94 | 94 | 89 | 94 | 94 |
| (A/B) * E | 49 | 45 | 46 | 44 | 45 | 60 | 35 | 31 | 42 | 46 | 44 | 47 | 39 | 44 | 43 |
| Tg | 547 | 544 | 552 | 543 | 547 | 547 | 510 | 489 | 538 | 549 | 543 | 557 | 533 | 546 | 547 |
| Hv | 680 | 680 | 680 | 680 | 680 | 690 | 630 | 620 | 680 | 670 | 670 | 680 | 660 | 670 | 660 |
| $T_L$ | ○ | ○ | ○ | ○ | ○ | ○ | ○ | ○ | ○ | ○ | ○ | ○ | ○ | ○ | ○ |
| $T_{log\eta=2}$ | ○ | ○ | ○ | ○ | ○ | ○ | ○ | ○ | ○ | ○ | ○ | ○ | ○ | ○ | ○ |

TABLE 3

| Glass Ingredients | Practical Example | | | | | | | | | | | | | |
|---|---|---|---|---|---|---|---|---|---|---|---|---|---|---|
| | 29 | 30 | 31 | 32 | 33 | 34 | 35 | 36 | 37 | 38 | 39 | 40 | 41 | 42 |
| $SiO_2$ | 55.7 | 55.7 | 55.7 | 55.7 | 59.2 | 59.2 | 59.9 | 59.9 | 59.9 | 59.9 | 59.9 | 60.1 | 60.1 | 60.1 |
| $Al_2O_3$ | 3.5 | 3.5 | 3.5 | 9.5 | 7.3 | 7.3 | 4.6 | 4.6 | 4.6 | 4.6 | 4.6 | 5.1 | 5.1 | 5.1 |
| $B_2O_3$ | 2.4 | 2.4 | 2.4 | 6.7 | 5.0 | 5.0 | 3.2 | 3.2 | 3.2 | 3.2 | 3.2 | 3.6 | 3.6 | 3.6 |
| $Li_2O$ | 4.4 | 4.4 | 4.4 | 3.7 | 3.4 | 3.4 | 4.0 | 4.0 | 4.0 | 4.0 | 4.0 | 3.7 | 3.7 | 3.7 |
| $Na_2O$ | 2.3 | 2.3 | 2.3 | 6.6 | 3.8 | 3.8 | 4.4 | 4.4 | 4.4 | 4.4 | 4.4 | 4.1 | 4.1 | 4.1 |
| $K_2O$ | 5.8 | 5.8 | 5.8 | 1.9 | 1.9 | 1.9 | 2.2 | 2.2 | 2.2 | 2.2 | 2.2 | 4.0 | 2.0 | 2.0 |
| $R_2O$ | 12.4 | 12.4 | 12.4 | 12.2 | 9.2 | 9.2 | 10.6 | 10.6 | 10.6 | 10.6 | 10.6 | 11.7 | 9.8 | 9.8 |
| MgO | 4.3 | 4.3 | 4.3 | 3.1 | 4.4 | 4.4 | 3.5 | 5.0 | 3.5 | 1.0 | 3.0 | 3.9 | 3.9 | 3.9 |
| CaO | 7.2 | 7.2 | 7.2 | 0.5 | 4.4 | 4.4 | 5.1 | 3.6 | 1.1 | 5.1 | 3.1 | 3.7 | 3.7 | 3.7 |
| SrO | | 2.4 | | | | | | | | | | | 2.0 | |
| BaO | | | 2.4 | | | | | | 2.5 | | | | | 2.0 |
| ZnO | | | | 3.6 | | | | | 2.5 | 1.0 | 4.5 | | | |
| $ZrO_2$ | 6.4 | 6.4 | 6.4 | 2.6 | 7.5 | 2.5 | 6.0 | 6.0 | 6.0 | 6.0 | 4.0 | 6.7 | 6.7 | 6.7 |
| $TiO_2$ | 5.5 | 5.5 | 5.5 | 3.6 | 1.6 | 6.6 | 5.3 | 5.3 | 5.3 | 5.3 | 5.3 | 3.2 | 3.2 | 3.2 |

TABLE 3-continued

| Glass Ingredients | Practical Example | | | | | | | | | | | | | |
|---|---|---|---|---|---|---|---|---|---|---|---|---|---|---|
| | 29 | 30 | 31 | 32 | 33 | 34 | 35 | 36 | 37 | 38 | 39 | 40 | 41 | 42 |
| $La_2O_3$ | | 2.4 | | 2.4 | 1.4 | 1.4 | 1.5 | 1.5 | 3.0 | 3.0 | 1.5 | 1.7 | 1.7 | 1.7 |
| $Y_2O_3$ | | | | | | | | | | | | | | |
| $CeO_2$ | | | | | | | | | | | | | | |
| $Gd_2O_3$ | | | | | | | | | | | | | | |
| $Er_2O_3$ | | | | | | | | | | | | | | |
| $Nb_2O_5$ | | | | | | | | | | | | | | |
| $Ta_2O_5$ | | | | | | | | | | | | | | |
| $Sb_2O_3$ | 0.3 | 0.3 | 0.3 | 0.2 | 0.2 | 0.2 | 0.2 | 0.2 | 0.2 | 0.2 | 0.2 | 0.3 | 0.3 | 0.3 |
| Expansion Coefficient A ($\times 10^{-7}/°$ C.) | 74 | 75 | 76 | 67 | 62 | 64 | 68 | 66 | 69 | 71 | 68 | 71 | 67 | 69 |
| Alkali Elution B (ppb) | 181 | 184 | 188 | 137 | 102 | 112 | 134 | 127 | 139 | 147 | 134 | 153 | 127 | 135 |
| Young's Modulus E (GPa) | 92 | 90 | 90 | 87 | 88 | 87 | 91 | 91 | 92 | 92 | 91 | 88 | 88 | 89 |
| (A/B) * E | 38 | 37 | 36 | 42 | 53 | 50 | 46 | 47 | 46 | 44 | 46 | 41 | 46 | 46 |
| Tg | 545 | 538 | 535 | 512 | 554 | 548 | 536 | 533 | 530 | 528 | 537 | 532 | 535 | 533 |
| Hv | 670 | 660 | 655 | 615 | 640 | 630 | 635 | 640 | 640 | 640 | 640 | 620 | 630 | 630 |
| $T_L$ | ○ | ○ | ○ | ○ | ○ | ○ | ○ | ○ | ○ | ○ | ○ | ○ | ○ | ○ |
| $T_{\log\eta=2}$ | ○ | ○ | ○ | ○ | ○ | ○ | ○ | ○ | ○ | ○ | ○ | ○ | ○ | ○ |

TABLE 4

| Glass Ingredients | Practical Example | | | | | | | | | | | | | | | | |
|---|---|---|---|---|---|---|---|---|---|---|---|---|---|---|---|---|---|
| | 43 | 44 | 45 | 46 | 47 | 48 | 49 | 50 | 51 | 52 | 53 | 54 | 55 | 56 | 57 | 58 | 59 |
| $SiO_2$ | 56.1 | 56.1 | 56.1 | 56.1 | 56.1 | 56.1 | 56.1 | 56.1 | 56.1 | 56.1 | 59.8 | 59.8 | 59.8 | 59.8 | 59.8 | 59.8 | 59.8 |
| $Al_2O_3$ | 5.6 | 5.6 | 5.6 | 5.6 | 5.6 | 5.6 | 5.6 | 5.6 | 5.6 | 5.6 | 3.6 | 3.6 | 3.6 | 3.6 | 3.6 | 3.6 | 3.6 |
| $B_2O_3$ | 3.9 | 3.9 | 3.9 | 3.9 | 3.9 | 3.9 | 3.9 | 3.9 | 3.9 | 3.9 | 2.5 | 2.5 | 2.5 | 2.5 | 2.5 | 2.5 | 2.5 |
| $Li_2O$ | 4.1 | 4.1 | 4.1 | 4.1 | 4.1 | 4.1 | 4.1 | 4.1 | 4.1 | 4.1 | 3.7 | 3.7 | 3.7 | 3.7 | 3.7 | 3.7 | 3.7 |
| $Na_2O$ | 4.5 | 4.5 | 4.5 | 4.5 | 4.5 | 4.5 | 4.5 | 4.5 | 4.5 | 4.5 | 1.9 | 1.9 | 1.9 | 1.9 | 1.9 | 1.9 | 1.9 |
| $K_2O$ | 2.3 | 2.3 | 2.3 | 2.3 | 2.3 | 2.3 | 2.3 | 2.3 | 2.3 | 2.3 | 4.9 | 4.9 | 4.9 | 4.9 | 4.9 | 4.9 | 4.9 |
| $R_2O$ | 10.8 | 10.8 | 10.8 | 10.8 | 10.8 | 10.8 | 10.8 | 10.8 | 10.8 | 10.8 | 10.5 | 10.5 | 10.5 | 10.5 | 10.5 | 10.5 | 10.5 |
| MgO | 4.3 | 4.3 | 4.3 | 4.3 | 4.3 | 4.3 | 4.3 | 4.3 | 4.3 | 4.3 | 4.4 | 4.4 | 4.4 | 4.4 | 4.4 | 4.4 | 4.4 |
| CaO | 6.3 | 4.3 | 4.3 | 4.3 | 6.3 | 6.3 | 6.3 | 6.3 | 6.3 | 6.3 | 4.4 | 4.4 | 4.4 | 4.4 | 4.4 | 4.4 | 4.4 |
| SrO | | 2.0 | | | | | | | | | | | | | | | |
| BaO | | | 2.0 | | | | | | | | | | | | | | |
| ZnO | | | | 2.0 | | | | | | | 3.0 | | | | | | |
| $ZrO_2$ | 4.4 | 4.4 | 4.4 | 4.4 | 4.4 | 4.4 | 4.4 | 4.4 | 4.4 | 4.4 | 5.5 | 5.5 | 5.5 | 5.5 | 5.5 | 5.5 | 5.5 |
| $TiO_2$ | 3.5 | 3.5 | 3.5 | 3.5 | 3.5 | 3.5 | 3.5 | 3.5 | 3.5 | 3.5 | 3.6 | 3.6 | 3.6 | 3.6 | 3.6 | 3.6 | 3.6 |
| $La_2O_3$ | 4.9 | 4.9 | 4.9 | 4.9 | | | | | | | 2.4 | 2.4 | 2.4 | 2.4 | 2.4 | 2.4 | 2.4 |
| $Y_2O_3$ | | | | | 4.9 | | | | | | | 3.0 | | | | | |
| $CeO_2$ | | | | | | 4.9 | | | | | | | 3.0 | | | | |
| $Gd_2O_3$ | | | | | | | 4.9 | | | | | | | 3.0 | | | |
| $Er_2O_3$ | | | | | | | | 4.9 | | | | | | | 3.0 | | |
| $Nb_2O_5$ | | | | | | | | | 4.9 | | | | | | | 3.0 | |
| $Ta_2O_5$ | | | | | | | | | | 4.9 | | | | | | | 3.0 |
| $Sb_2O_3$ | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Expansion Coefficient A ($\times 10^{-7}/°$ C.) | 73 | 74 | 75 | 71 | 74 | 73 | 72 | 72 | 71 | 71 | 66 | 69 | 68 | 69 | 68 | 67 | 67 |
| Alkali Elution B (ppb) | 157 | 158 | 164 | 148 | 160 | 157 | 152 | 153 | 148 | 147 | 137 | 149 | 145 | 147 | 144 | 141 | 143 |
| Young's Modulus E (GPa) | 93 | 92 | 91 | 93 | 95 | 94 | 93 | 93 | 95 | 95 | 89 | 92 | 91 | 90 | 90 | 91 | 91 |
| (A/B) * E | 43 | 43 | 42 | 45 | 44 | 44 | 44 | 44 | 46 | 46 | 43 | 43 | 43 | 42 | 42 | 43 | 43 |
| Tg | 536 | 533 | 530 | 541 | 538 | 533 | 533 | 536 | 541 | 539 | 546 | 546 | 546 | 546 | 546 | 546 | 546 |
| Hv | 660 | 650 | 650 | 660 | 680 | 660 | 660 | 650 | 670 | 680 | 630 | 640 | 640 | 640 | 640 | 660 | 660 |
| $T_L$ | ○ | ○ | ○ | ○ | ○ | ○ | ○ | ○ | ○ | ○ | ○ | ○ | ○ | ○ | ○ | ○ | ○ |
| $T_{\log\eta=2}$ | ○ | ○ | ○ | ○ | ○ | ○ | ○ | ○ | ○ | ○ | ○ | ○ | ○ | ○ | ○ | ○ | ○ |

TABLE 5

| Glass Ingredients | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 42.9 | 72.1 | 64.9 | 64.9 | 66.9 | 58.8 | 64.8 | 53.1 | 53.1 | 59.2 | 59.2 |
| $Al_2O_3$ | 9.1 | 3.1 | 12.9 | 16.9 | 2.9 | 3.6 | | 5.6 | 5.6 | 7.3 | 7.3 |
| $B_2O_3$ | 4.4 | 3.6 | 8.8 | 3.8 | 13.8 | | 2.5 | 3.9 | 3.9 | 2.0 | 1.5 |

TABLE 5-continued

|  | Comparative Examples | | | | | | | | | | |
|---|---|---|---|---|---|---|---|---|---|---|---|
| Glass Ingredients | 1 | 2 | 3 | 4 | 5 | 6 | 7 | 8 | 9 | 10 | 11 |
| $Li_2O$ | 4.3 | 3.7 | 3.2 | 3.2 | 3.2 | 3.7 | 3.7 | 4.1 | 4.1 | 3.4 | 3.4 |
| $Na_2O$ | 3.4 | 3.1 | 5.6 | 4.6 | 5.6 | 1.9 | 1.9 | 4.5 | 4.5 | 3.8 | 3.8 |
| $K_2O$ | 7.3 | 2.0 | 1.6 | 1.6 | 1.6 | 4.9 | 4.9 | 2.3 | 2.3 | 1.9 | 1.9 |
| $R_2O$ | 15.0 | 8.8 | 10.4 | 9.4 | 10.4 | 10.5 | 10.5 | 10.8 | 10.8 | 9.2 | 9.2 |
| MgO | 3.6 | 3.9 |  | 1.0 |  | 4.4 | 2.4 | 1.3 | 12.3 | 4.4 | 4.4 |
| CaO | 5.0 | 1.7 |  |  |  | 4.4 | 2.4 | 12.3 | 3.3 | 3.4 | 4.4 |
| SrO |  |  |  |  |  |  |  |  |  |  |  |
| BaO |  |  |  |  |  |  |  |  |  |  |  |
| ZnO | 3.6 |  |  |  |  | 3.0 | 3.0 |  |  |  |  |
| $ZrO_2$ | 6.3 | 3.7 |  | 2.8 | 1.0 | 7.0 | 3.5 | 6.4 | 1.4 | 13.5 | 1.0 |
| $TiO_2$ | 5.6 | 2.9 |  | 1.0 | 2.0 | 5.6 | 8.6 | 4.5 | 7.5 | 1.0 | 13.0 |
| $La_2O_3$ | 4.3 |  | 2.8 |  | 2.8 | 2.4 | 2.0 | 1.9 | 1.9 |  |  |
| $Y_2O_3$ |  |  |  |  |  |  |  |  |  |  |  |
| $CeO_2$ |  |  |  |  |  |  |  |  |  |  |  |
| $Gd_2O_3$ |  |  |  |  |  |  |  |  |  |  |  |
| $Er_2O_3$ |  |  |  |  |  |  |  |  |  |  |  |
| $Nb_2O_5$ |  |  |  |  |  |  |  |  |  |  |  |
| $Ta_2O_5$ |  |  |  |  |  |  |  |  |  |  |  |
| $Sb_2O_3$ | 0.2 | 0.3 | 0.2 | 0.2 | 0.2 | 0.3 | 0.3 | 0.3 | 0.3 | 0.2 | 0.2 |
| Expansion Coefficient A ($\times 10^{-7}$/° C.) | 85 | 57 | 58 | 59 | 54 | 67 | Devitrification Observed, Not Vitrified | 76 | 71 | Unmelted Matter Observed When Melted | 61 |
| Alkali Elution B (ppb) | 352 | 82 | 104 | 102 | 338 | 278 |  | 312 | 288 |  | 311 |
| Young's Modulus E (GPa) | 84 | 78 | 78 | 80 | 76 | 88 |  | 90 | 89 |  | 86 |
| (A/B) * E | 20 | 54 | 44 | 46 | 12 | 21 |  | 22 | 22 |  | 17 |
| Tg | 509 | 536 | 518 | 529 | 509 | 542 |  | 538 | 543 |  | 556 |
| Hv | 567 | 630 | 620 | 580 | 530 | 610 |  | 540 | 560 |  | 580 |
| $T_L$ | x | ○ | ○ | ○ | ○ | x |  | x | x |  | x |
| $T_{log\eta=2}$ | ○ | ○ | x | x | ○ | ○ |  | ○ | ○ |  | ○ |

TABLE 6

|  |  | Practical Example | | | | | | Comparative Example |
|---|---|---|---|---|---|---|---|---|
|  |  | 3 | 14 | 29 | 35 | 43 | 53 | 1 |
| Surface Roughness | Ra After Polishing | 1.0 | 1.0 | 0.9 | 0.9 | 0.8 | 0.7 | 0.8 |
|  | Ra' After Cleaning | 1.2 | 1.2 | 1.1 | 0.9 | 1.0 | 0.8 | 1.5 |
|  | Ra'/Ra | 1.2 | 1.2 | 1.2 | 1.0 | 1.3 | 1.1 | 1.9 |

What is claimed is:

1. A glass substrate having uniform composition both at a surface and an interior thereof and having an amorphous structure, wherein the glass material fulfills the following conditions:

$(A/B) \times E \times 10^7 \geq 30$ $62 \times 10^{-7} \leq A \leq 82 \times 10^{-7}$ $B \leq 250$ ppb (per 2.5-inch disk)

$85 \leq E \leq 95$ where

A represents a linear thermal expansion coefficient (/° C.);
B represents alkali elution (ppb) (per 2.5-inch disk); and
E represents a Young's modulus (GPa);
wherein the glass substrate is produced by undergoing a polishing step and then a cleaning step in which the glass substrate is cleaned with at least one of a pure water liquid, an acidic liquid, and an alkaline liquid, and a surface roughness Ra after the polishing step and a surface roughness Ra' after the cleaning step fulfill both of the following conditions:

$Ra'/Ra \leq 1.5$, and $Ra \leq 1.0$ nm.

2. An information recording medium comprising:
a glass substrate; and
a magnetic film formed on top of the glass substrate directly or with one or more primer and/or protective layers sandwiched in between,
wherein the glass substrate has uniform composition both at a surface and an interior thereof, has an amorphous structure, and fulfills the following conditions:

$(A/B) \times E \times 10^7 \leq 30$ $62 \times 10^{-7} \leq A \leq 82 \times 10^{-7}$ $B \leq 250$ ppb (per 2.5-inch disk)

$85 \leq E \leq 95$ where

A represents a linear thermal expansion coefficient (/° C.);
B represents alkali elution (ppb) (per 2.5-inch disk); and
E represents a Young's modulus (GPa);
wherein the glass substrate is produced by undergoing a polishing step and then a cleaning step in which the glass substrate is cleaned with at least one of a pure water liquid, an acidic liquid, and an alkaline liquid, and a surface roughness Ra after the polishing step and a surface roughness Ra' after the cleaning step fulfill both of the following conditions:

$Ra'/Ra \leq 1.5$, and $Ra \leq 1.0$ nm.

* * * * *